United States Patent Office 3,512,642
Patented May 19, 1970

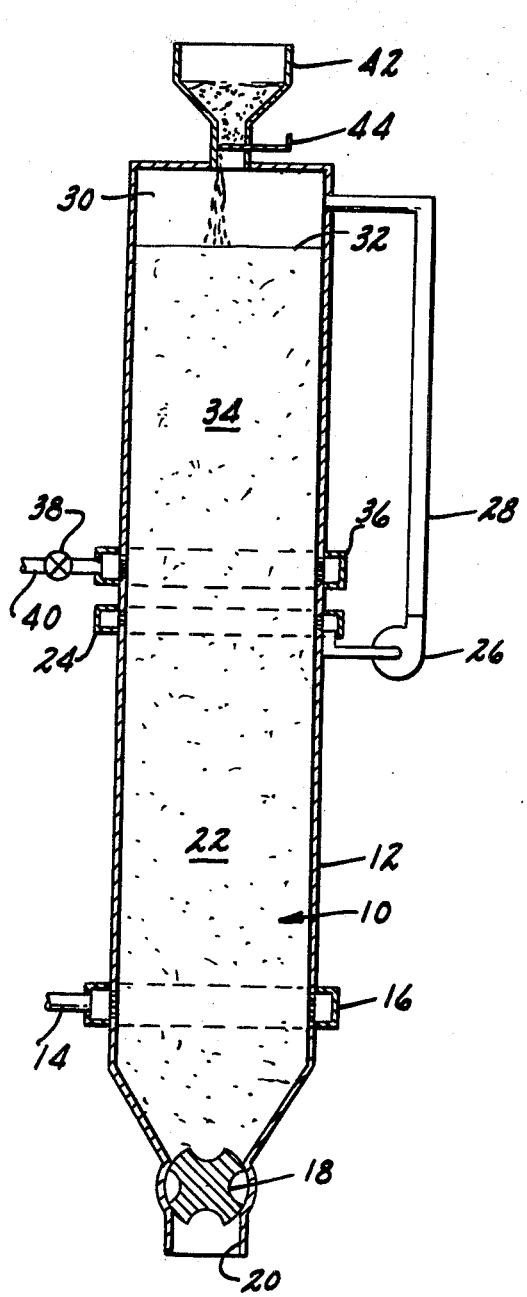
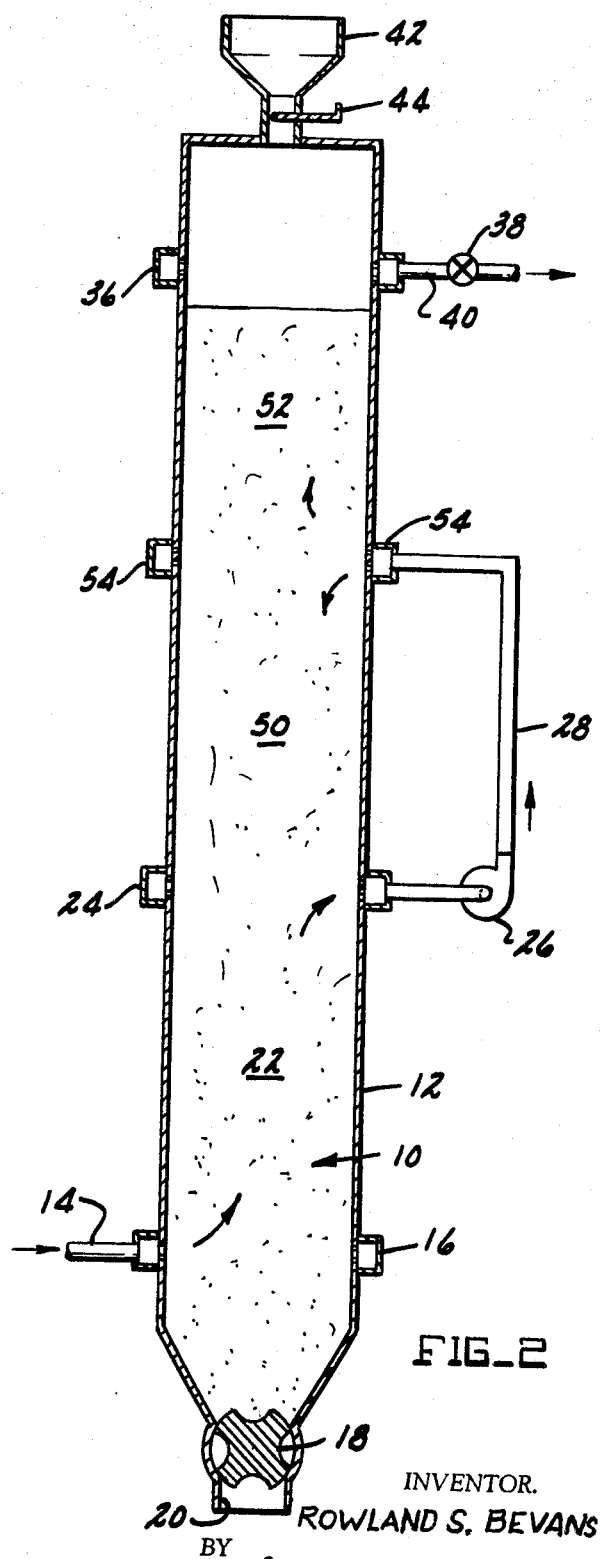
FIG_1
FIG_2
INVENTOR.
ROWLAND S. BEVANS
BY
*Jefferson Ehrlich*
ATTORNEY

3,512,642
**COUNTERCURRENT SOLID-LIQUID
CONTACTING SYSTEM**
Rowland S. Bevans, Morristown, N.J., assignor to American Standard Inc., New York, N.Y., a corporation of Delaware
Filed Oct. 18, 1967, Ser. No. 676,266
Int. Cl. B01d *33/20*
U.S. Cl. 210—80                              9 Claims

ABSTRACT OF THE DISCLOSURE

This invention relates to method and apparatus for passing a liquid to be treated, such as sewage, upwardly through the lower portion of a confined bed of solid, closely packed particles, such as coal, to effect a filtering, and/or adsorption and/or other mass transfer process. The specific improvement is in the means and method for maintaining the bed in a compacted condition, while effectively utilizing all of the bed for mass transfer purposes.

CROSS-REFERENCES TO RELATED APPLICATIONS

Several other patent applications are being filed concurrently or substantially concurrently herewith. Those applications are identified as follows: R. S. Bevans, Ser. No. 676,193, filed Oct. 18, 1967; J. B. Hellmann, Ser. No. 676,180, filed Oct. 18, 1967; I. J. Kugelman, Ser. No. 676,192, filed Oct. 18, 1967; and I. J. Kugelman et al., Ser. No. 676,167, filed Oct. 18, 1967.

BACKGROUND OF THE INVENTION

The invention is useful in various liquid treating applications such as the treatment of sewage, industrial wastes, and municipal water supplies.

The closest known prior art is U.S. Pat. No. 3,244,561.

SUMMARY

This invention relates to a method and apparatus for continuous countercurrent contact between a liquid stream and a confined bed of closely packed solid particles. It is specifically applicable in the use of a bed of powdered, granular or lump coal for the treatment of sewage and industrial liquid wastes. However, the invention should be generally applicable for other concurrent liquid-solid processes, such as the filtration of water for municipal or industrial water supply through a bed of sand, or the continuous softening of water with ion exchange resins.

The invention also contemplates the final withdrawal of the treated liquid from such areas of the bed as will ensure effective utilization of substantially the entire bed volume without intermingling of the inlet and recirculating streams.

THE DRAWINGS

FIG. 1 is a sectional view taken through an apparatus embodying the invention.

FIG. 2 is a sectional view taken through a second apparatus embodying the invention.

GENERAL ARRANGEMENT

As shown in FIG. 1, raw liquid sewage is pumped by non-illustrated means through inlet pipe 14 to the lower portion of an upstanding treatment coal bed 10 confined within a cylindrical vessel 12. Within the broader aspects of the invention, the liquid could be any liquid to be treated, and the bed could be formed of different particulate matter such as sand, stone or other granular or powdered material In the illustrated arrangement the liquid is introduced through an annular chamber or jacket 16 having a perforated wall portion, formed for example of screening or expanded metal, to prevent the bed particles from gravitating into chamber 16. Other liquid inlet mechanisms such as perforated pipes, could be employed in lieu of the illustrated jacket.

The bottom of vessel 12 is closed by a rotary ball valve 18 which is arranged to be continuously or periodically rotated to exhaust spent bed material downwardly through an exit opening 20. Other types of valves might be employed in lieu of the illustrated rotary ball valve 18 to control the rate of removal of bed solids. Valve 18 restricts the downflow of liquid so that the liquid is caused to flow generally upwardly from chamber 16 through zone 22 of the bed toward intermediate exhaust chamber 24, shown as an annular jacket. During its upflow through zone 22, the liquid undergoes filtering and adsorption processes due to contact with the packed coal particles.

Connected with chamber 24 is a conventional liquid pump 26 having an outlet thereof communicating with a second liquid inlet pipe 28. The liquid from pump 26 is fed into the confined space 30 above the bed upper surface 32. Thereafter, the liquid flows downwardly through upper zone 34 of the bed to an outlet chamber 36 located a small distance above chamber 24.

The quantity of liquid flowing downward through upper zone 34 will be at least as great as the quantity of liquid influent fed to the apparatus through inlet pipe 14 and will usually be two or more times as great in order to produce sufficient downward pressure on the bed solids. In the latter case, only enough of the downward flowing liquid will be removed through outlet chamber 36 to equal the liquid influent through inlet pipe 14 and the rest of the downward flowing liquid will flow further down the bed and out through chamber 24 where it will mix with the liquid flowing up through lower zone 22 and be recyled through pump 26 and second inlet pipe 28. An adjustable or fixed orifice restriction 38 may be placed in discharge pipe 40 to partially throttle the liquid discharge flow and thereby cause it to match the inlet flow to the apparatus.

It will be noted that the liquid undergoes treatment in the two different zones 22 and 34. Thus, substantially all of the bed is utilized for treatment purposes. At the same time the liquid downflow through zone 34 produces a downward pressure on the bed which advantageously minimizes or prevents bed fluidization or uplift of the bed and also helps to move the bed downward as solids are removed at the bottom through valve 18. The compacted bed thus has an improved and more extensive contact with the liquid as compared with fluidized or relatively porous non-compacted beds. The desired downward force is a function of the weight of the solids, the particle size and shape of the solids, the height of zone 34, the diameter of confining vessel and the rate of liquid downflow in zone 34.

As shown in FIG. 1, new bed material may be introduced to the upper surface 32 of the bed, as from a supply hopper 42 having a metering valve 44 associated therewith. If the apparatus is run on a continuous-run basis, as, for example, by automated controls, the rotational rate of movement of discharge valve 18 will be correlated with the movement and position of supply valve 44 to maintain a substantially constant surface level 32. The downward flow rate of liquid through upper zone 34 may be adjusted by setting the pumping rate of pump 26 and throttling orifice 38 to exert the desired downward liquid function pressure on the bed solids so that this downward pressure combined with the weight of the bed will exhaust bed material through valve 18 at a desired rate consistent with the expected rate of bed clogging. It will be apparent that the throttling valve 38 and the pump 26 may be separately controlled by suitable electrical circuitry so as to achieve the desired downward flow rate.

If the apparatus is run on a stop-and-go or non-continuous basis, the valves 18 and 44 may be so controlled as to be opened only at certain periods in the cycle, depending on the rate of clogging of the bed. The clogging is of course greatest near inlet 16 where the solids concentration in the influent is highest. Ordinarily it is not desirable to allow this area of the bed to become too heavily clogged since this creates an excessive pressure head for the raw influent supply pump (not shown). Oversize pumps can be employed but the resultantly higher pressures near inlet 16 then tend to move the bed bodily upwardly and greatly increase the difficulty in moving the bed downward to discharge spent solids through valve 18. Therefore, it is desirable to provide some arrangement for exhausting spent bed material and adding new bed material which can be controlled in accordance with the clogging rate. The illustrated arrangement of valves 18, 44 and 38 is believed to be a most practicable method of bed replenishment.

In the FIG. 1 apparatus, the fully treated liquid flowing downwardly through zone 34 is at times relatively close to the partially treated liquid flowing upwardly through zone 22. Thus, outlet chamber 36 is quite close to the take-off chamber 24. However, the upflowing liquid stream will not appreciably merge into the fully treated liquid stream leaving through outlet chamber 36 because there will usually be more liquid flowing downward in zone 34 than out through chamber 36. The excess liquid will continue down past chamber 34 to chamber 24, thereby effectively barring any upflow of liquid from lower zone 22 past chamber 24. The product issuing through pipe 40 will thus be substantially entirely liquid which has been subjected to two treating actions, first in zone 22 and later in zone 34. The exit liquid will thus presumably have a greater purity than would be the case if chambers 24 and 36 were formed as a single chamber.

The FIG. 2 apparatus is in many respects similar to FIG. 1, and similar reference numerals are employed where applicable. The FIG. 2 arrangement is designed for use where extremely tall beds of relatively small diameter are required. In such bed environments, the frictional forces due to the vessel wall and the upflowing liquid may be so large as to prevent a downward force acting at the top of the upflow section from being effective in pushing down the bed to exhaust spent bed material through valve 18. FIG. 2 is therefore an arrangement for producing downward forces at a lower region in the bed than can be produced by the FIG. 1 arrangement.

In FIG. 2 the recycled liquid from pipe 28 can flow both downwardly through zone 50 and upwardly through zone 52. Downflow through zone 50 is possible because the liquid pressure at reintroduction chamber 54 is greater than the liquid pressure adjacent take-off chamber 24. This is due to the energy put into the liquid by pump 26 and the restrictions to outlet flow at the top of the bed by valve 38. Upflow of liquid from chamber 54 through zone 52 represents the useful product; it is exhausted through chamber 36 into pipe 40.

The amount of downflow through zone 50 may be regulated to a certain extent by changing the pumping rate of pump 26 and by appropriate adjustment of throttling orifice 38 to maintain the same outlet liquid flow rate through line 40 as comes into the bed through inlet pipe 14. By thus regulating the downflow, it is possible to vary the bed compaction force and the bed exhaustion forces. Greater downflow forces (increased rate of pump 26 and throttling at 38) tend to more positively and effectively move the bed in the direction of valve 18. As previously noted, this more positive action may be especially beneficial or necessary when extremely tall beds are required. Some situations may be suited to the FIG. 1 arrangement, while others may be suited to the FIG. 2 design. It will be apparent that the number of downflow sections may of course be increased, as by the addition of liquid take-off chambers, reintroduction chambers, and recycle pumps. Even then, the downward force may not be great enough to move the bed downward to exhaust spent solids through valve 18 if the bed height for zone 22 is too great. Greater downward pressure at exhaust valve 18 can be achieved by reducing the height of zone 22 and increasing the height of zone 52.

In effect, the foregoing contemplates that the chambers 54 and 24 be moved to lower levels in the bed as will now be discussed. The lower limit for the level of chamber 24 in the case of sewage or other filtration process is a level where enough of the suspended solids has been removed from the influence liquid so that the screens or other barriers for keeping coal out of chamber 24 will not become clogged. In any case, most efficient use is made of the bed solids if the flow is countercurrent as much as possible. For this reason, it is desirable to have the liquid downflow bed zone 50 as far up from the bottom of the column as possible consistent with obtaining sufficient downward force to exhaust spent solids through valve 18. For this reason, it is desirable to have the liquid upflow sections of the bed zones 22 and 52 relatively as large as possible and the liquid downflow zone 50 relatively as short as possible again consistent with obtaining sufficient downward force on the bed.

For extremely tall beds relative to their cross sections, it may be desirable to have more than one liquid downflow section in order to produce downward forces at the most effective levels in the solid bed and at the same time have liquid flowing upward countercurrent to the solid in as large a part of the bed as possible.

What is claimed is:

1. The method of treating a liquid in a common vessel comprising the steps of feeding the liquid to be treated into, and then upwardly through, the lower portion of a confined bed of solid closely packed particles within said vessel; withdrawing the liquid from the bed before it has reached the upper bed surface; reintroducing the withdrawn liquid back into the same bed at a point above the first liquid withdrawal point; and withdrawing liquid product from the bed at a third point located above the first liquid withdrawal point but below the reintroduction point.

2. The method of claim 1 and further comprising the step of replenishing the bed material as its treating usefulness decreases; said replenishing step comprising the component steps of removing spent material from the bed lower surface, and adding new material to the bed upper surface.

3. Liquid treating apparatus comprising: a single vessel substantially uniform in cross-section; a liquid treatment bed within said vessel and having a confined mass of solid closely packed particles; liquid inlet means operable to feed raw liquid into the bottom of a lower portion of the bed; first liquid outlet means located part way up the height of the bed above the inlet means, whereby liquid flows from the inlet means upwardly through the bed and into the outlet means before reaching the bed upper surface; a liquid reintroduction port means located at a point in the bed above the first liquid outlet means; means including a pump for recycling liquid from the first outlet means to the reintroduction port means; and a second liquid outlet means located at a point above the first liquid outlet means but below the reintroduction port for receiving liquid flowing through the bed from the reintroduction port means.

4. The liquid treating apparatus of claim 3 wherein the second outlet means is located adjacent the first outlet means and remote from the reintroduction port means.

5. The liquid treating apparatus of claim 3 and further comprising means for replenishing the bed material as its treating usefulness decreases; said replenishing means comprising an exit opening communicating with a lower portion of the bed for exhausting spent material from the bed lower surface, and an entrance opening communicating with an upper portion of the bed for adding new material to the bed upper surface.

6. Treating apparatus comprising a vertical elongated vessel containing a bed of treatment material, inlet means near the bottom of the vessel for receiving material to be treated, coupler means for feeding liquid moving upwardly and received at an intermediate region of the bed to a region at or near the top of the bed so that said liquid may flow downwardly, and outlet means positioned at a region between the top of the bed and the intermediate region for discharging the treated product of the apparatus.

7. The treating apparatus of claim 6 wherein the coupler means includes a pump.

8. The treating apparatus of claim 7 wherein the outlet means includes a volume controlling valve.

9. The treating apparatus of claim 8 including means for exhausting spent bed treatment material and replenishing such material with new treatment material.

References Cited

UNITED STATES PATENTS

| | | | |
|---|---|---|---|
| 2,057,887 | 10/1936 | Elliott et al. | 210—268 X |
| 2,631,727 | 3/1953 | Cichelli | 210—189 X |
| 2,801,966 | 8/1957 | Mertes et al. | 210—268 X |
| 3,298,950 | 1/1967 | Mindler | 210—189 X |

JOHN W. ADEE, Primary Examiner

U.S. Cl. X.R.

210—189, 196, 268, 269